(12) United States Patent
Tan

(10) Patent No.: US 9,623,530 B2
(45) Date of Patent: Apr. 18, 2017

(54) PRECISION CNC FACING LATHE

(75) Inventor: Songjiang Tan, Shandong (CN)

(73) Assignee: YANTAI LUCHEN-SEAWOO CNC MACHINERY CO., LTD, Yantai (CN)

( * ) Notice: Subject to any disclaimer, the term of this patent is extended or adjusted under 35 U.S.C. 154(b) by 286 days.

(21) Appl. No.: 14/124,729

(22) PCT Filed: Nov. 28, 2011

(86) PCT No.: PCT/CN2011/083054
§ 371 (c)(1),
(2), (4) Date: Dec. 9, 2013

(87) PCT Pub. No.: WO2012/167575
PCT Pub. Date: Dec. 13, 2012

(65) Prior Publication Data
US 2014/0102269 A1    Apr. 17, 2014

(30) Foreign Application Priority Data

Jun. 8, 2011    (CN) .......................... 2011 1 0151414

(51) Int. Cl.
*B23Q 5/44*    (2006.01)
*B23B 29/034*    (2006.01)

(52) U.S. Cl.
CPC .......... *B23Q 5/44* (2013.01); *B23B 29/03439* (2013.01); *B23B 29/03471* (2013.01); *B23B 2250/04* (2013.01); *Y10T 82/2512* (2015.01)

(58) Field of Classification Search
CPC ........ B23B 29/03471; B23B 29/03439; B23B 29/034; B23B 2250/08; B23B 2250/00; B23B 2250/10; B23B 2250/04; B22F 2998/00; B23Q 2716/00; B23Q 5/44

USPC .............................. 82/124, 1.2, 158, 127, 123
See application file for complete search history.

(56) References Cited

U.S. PATENT DOCUMENTS

| | | | | |
|---|---|---|---|---|
| 2,164,900 A | * | 7/1939 | Campbell | ...................... 451/343 |
| 3,673,886 A | * | 7/1972 | Tomita et al. | ............. 74/424.75 |
| 3,726,162 A | * | 4/1973 | Sato | ............................... 82/118 |
| 3,750,245 A | * | 8/1973 | Kennedy et al. | ................. 29/39 |
| 4,083,272 A | * | 4/1978 | Miller | ............................... 82/12 |
| 4,400,859 A | * | 8/1983 | Woythal et al. | ............. 29/27 C |

(Continued)

FOREIGN PATENT DOCUMENTS

| CN | 201295836 Y | 8/2009 |
|---|---|---|
| CN | 101518879 A | 9/2009 |

(Continued)

OTHER PUBLICATIONS

International Search Report of PCT Application No. PCT/CN2011/083054.

*Primary Examiner* — Sara Addisu

(57) ABSTRACT

The present invention relates to a precision CNC facing lathe, which comprises a facing head that has slide ways and a feed slide that is mounted in the slide ways on the facing head, wherein, a ball screw feeder that can drive the slide to move in radial direction and a dynamic balancer are arranged on the facing head. The dynamic balancer comprises weight blocks, a weight cable, fixed blocks, and pulleys. The lathe provided in the present invention can absolutely substitute conventional rack-and-gear driven CNC facing lathes, and can improve work piece machining accuracy and machining efficiency.

1 Claim, 3 Drawing Sheets

(56) References Cited

U.S. PATENT DOCUMENTS

| | | | | |
|---|---|---|---|---|
| 4,430,913 A | * | 2/1984 | Williamson | 82/70.2 |
| 4,949,443 A | * | 8/1990 | Saruwatari et al. | 29/27 C |
| 5,214,829 A | * | 6/1993 | Minagawa | 29/27 C |
| 2002/0189412 A1 | * | 12/2002 | Ishida et al. | 82/1.2 |
| 2004/0231396 A1 | * | 11/2004 | Kato | 72/452.6 |
| 2005/0155470 A1 | * | 7/2005 | Ricci et al. | 82/1.2 |
| 2011/0214540 A1 | * | 9/2011 | Grob | 82/124 |

FOREIGN PATENT DOCUMENTS

| | | | | |
|---|---|---|---|---|
| CN | 201415275 | Y | | 3/2010 |
| CN | 101870011 | A | | 10/2010 |
| DE | 102011050448 | A1 | * | 11/2012 |
| JP | 47-024684 | U | | 11/1972 |
| JP | 47-026393 | U | | 11/1972 |
| JP | 48-048292 | U | | 6/1973 |
| JP | 50-000485 | A | | 1/1975 |
| JP | 52-156380 | U | | 11/1977 |
| JP | 55-106702 | A | | 8/1980 |
| JP | 55106702 | A | * | 8/1980 |
| JP | 5-138403 | A | | 6/1993 |
| JP | H05-60747 | U | | 8/1993 |
| JP | 06344187 | A | * | 12/1994 |
| JP | 10-109246 | A | | 4/1998 |

* cited by examiner

PRECISION CNC FACING LATHE

FIELD OF THE INVENTION

The present invention relates to the technical domain of machine tools, particularly to a precision CNC (Computerized Numerical Control) facing lathe.

BACKGROUND OF THE INVENTION

CNC facing lathes are widely applied in the workpiece machining field, because its radial slide can be moved conveniently on the facing head. On existing CNC facing lathes, the slide is driven by a rack-and-gear mechanism to slide in radial direction, i.e., the main rack runs across the spindle and is driven by an electric motor behind the lathe ram via the screw shaft, the other end of the main rack drives a gear in the facing head to rotate, and the gear drives a rack on the slide to move, so that the slide moves in radial direction. However, that driving structure has some major drawbacks: first, the positioning repeatability is low and the machining efficiency and workpiece machining accuracy are degraded, due to the severe backlash between the rack and the gear during power transfer; second, the facing head system will be out of balance when the feed slide biases to a side; consequently the facing head will have vibration or shock when it rotates at a high speed, resulting in degraded work piece machining accuracy or limited rotation speed of the facing head; third, the mechanism has a complex structure and has a strict requirement for assembling accuracy.

SUMMARY OF THE INVENTION

To overcome the drawbacks in the prior art, the present invention provides a precision CNC facing lathe, which has high positioning accuracy and can be adjusted conveniently, and can improve machining efficiency; in addition, the facing head system can keep in a well-balanced state in the slide block adjustment process.

The present invention employs the following technical scheme to solve the technical problems in the prior art: a precision CNC facing lathe, comprising a facing head that has slideways and a feed slide that is mounted in the slideways on the facing head, wherein, a ball screw feeder that can drive the feed slide to move in radial direction is arranged on the facing head.

The present invention has the following beneficial effects: since ball screw driving is used, the feed slide can be positioned accurately, and thereby the lathe can be adjusted very conveniently; thus, the machining efficiency is improved, the driving system is simplified, a cumbersome driving mechanism can be omitted, and the manufacturing cost of the lathe is reduced.

On the basis of the technical scheme described above, the present invention can be further improved as follows:

Moreover, the ball screw feeder comprises a ball screw, an electric motor, a belt, and ball screw assembly, wherein, the two ends of the ball screw are fixed to the facing head via supporting bearings. The electric motor is connected to the ball screw via the belt, and the ball screw is connected to the slide via the ball screw assembly.

Moreover, the ball screw feeder further comprises a signal converter that supplies electric power to the electric motor, wherein, the signal converter is mounted on the tail end of the spindle, to accomplish conversion from static power signal to dynamic power signal.

Moreover, a dynamic balancer is arranged on the facing head.

Moreover, the dynamic balancer comprises weight blocks, a weight cable, fixed blocks, and pulleys, wherein, the pulleys are arranged in a pair, the weight cable is wound on the pair of pulleys, the weight blocks are fixed to the outer side of the weight cable, the fixed blocks are fixedly connected to the ball screw assembly, and the weight cable is connected to the fixed blocks.

The improved technical scheme described above has the following beneficial effects: since a dynamic balancer is used, the facing head system will always keep in a well-balanced state in the slide block adjustment process; therefore, vibrations of the lathe can be reduced, and the workpiece machining accuracy and the rotation speed of the lathe can be improved.

DETAILED DESCRIPTION OF THE EMBODIMENTS

Figure 1:
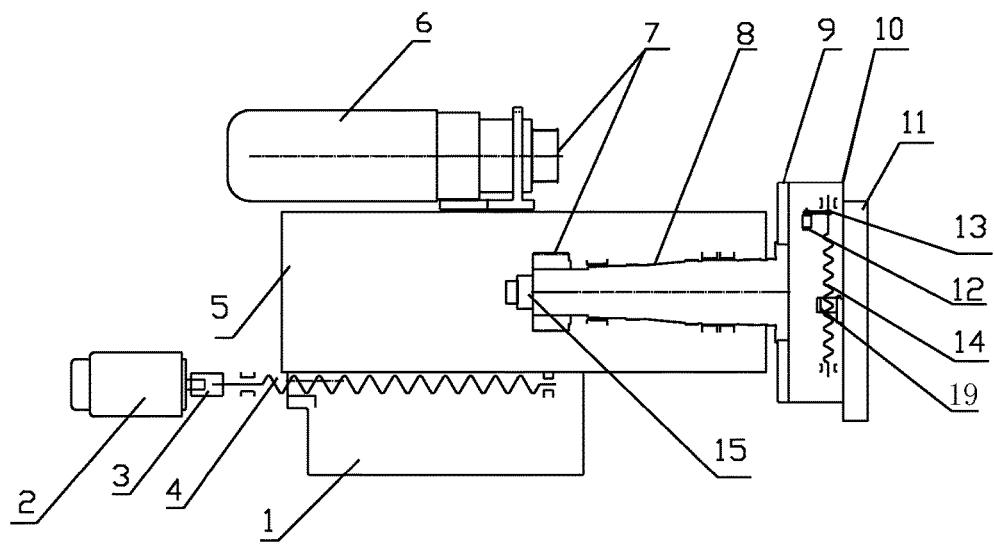
FIG. 1 is a schematic structural diagram of the precision CNC facing lathe provided in the present invention.
Figure 2:
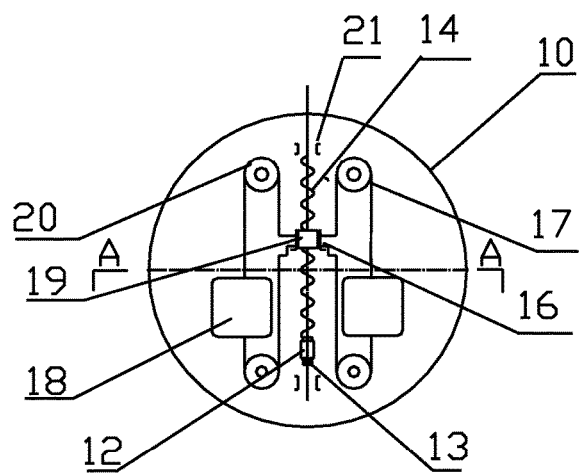
FIG. 2 shows the mounting positions of the ball screw feeder and dynamic balancer on the facing head in the present invention.
Figure 3:
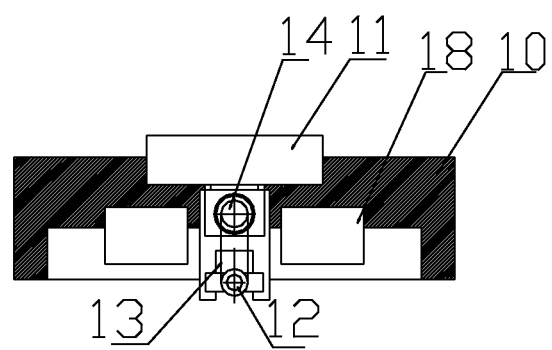
FIG. 3 is a sectional view A-A of the structure shown in FIG. 2.
Figure 4:
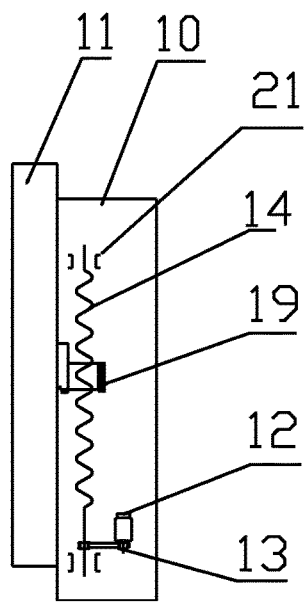
FIG. 4 is a side view of the ball screw feeder shown in FIG. 2.

Hereunder the principle and characteristics of the present invention will be detailed with reference to the accompanying drawings. However, it should be noted that the embodiments are provided only to interpret the present invention, and don't constitute any limitation to the scope of the present invention.

As shown in FIGS. 1~4, the precision CNC facing lathe in an embodiment of the present invention comprises a facing head 10 that has slide ways and a feed slide 11 that is mounted in the slide ways on the facing head 10, wherein, a ball screw feeder that can drive the feed slide 11 to move in radial direction and a dynamic balancer are arranged on the facing head 10. The facing head 10 is mounted on a spindle 8 via a flange 9.

The ball screw feeder comprises a ball screw 14, an electric motor 12, a belt 13, and ball screw assembly 19, wherein, the two ends of the ball screw 14 are fixed to the facing head 10 via supporting bearings 21. The electric motor 12 is connected to the ball screw 14 via the belt 13, and the ball screw 14 is connected to the feed slide 11 via the ball screw assembly 19.

The dynamic balancer comprises weight blocks 18, a weight cable 17, fixed blocks 16, and pulleys 20. The pulleys 20 are arranged in a pair, the weight cable 17 is wound on the pair of pulleys 20, the weight blocks 18 are fixed to the outer side of the weight cable 17, the fixed blocks 16 are fixedly connected to the ball screw assembly 19, and the weight cable 17 is connected to the fixed blocks 16.

Figure 5:
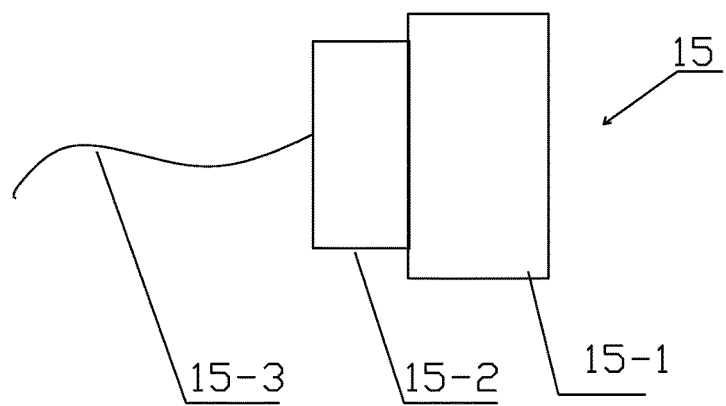
FIG. 5 is a schematic structural diagram of the signal transducer described in the present invention.

The ball screw feeder further comprises a signal converter 15 that supplies electric power to the electric motor 12, wherein, the signal converter 15 is mounted on the tail end of the spindle 8, to accomplish conversion from static power signal to dynamic power signal. As shown in FIG. 1 and FIG. 5, the signal converter 15 is an imported high-end technical product, comprising a rotary end 15-1, a stationary end 15-2, and lead wires 15-3. The rotary end 15-1 is coaxially connected to the spindle 8 and rotates with the spindle, while the stationary end 15-2 remains stationary; the stationary end has lead wires 15-3 that are connected to external power supply, so as to convert the signal from the external power supply into dynamic power supply to the electric motor 12.

The operating principle of the precision CNC facing lathe provided in the present invention is as follows: a ram 5 is mounted on a bed 1 and is driven by a main lead screw 4 mounted on the bed 1 to move along horizontal axis, and the main lead screw 4 is driven by the electric motor 2 via a coupling 3; to move a cutter in radial direction, a lathe control system instructs the electric motor 12 to operate and drive the ball screw 14 to rotate via the pulley belt 13, and the ball screw assembly 19 drives the feed slide 11 to move in radial direction; finally, the feeding is stopped when a set value is reached.

The spindle 8 is driven by a spindle motor 6 via a pulley belt 7.

The facing head mechanism that has a ball screw feeder and a dynamic balancer described in the present invention can also be applied on a variety of rotary cutting machines, such as horizontal milling machines, vertical milling machines, vertical lathes, vertical boring machines, and horizontal boring machines, etc.

While the present invention is described above in some preferred embodiments, the present invention is not limited to those preferred embodiments. Any modification, equivalent replacement, and improvement made without departing from the spirit and principle of the present invention shall be deemed as falling into the protected domain of the present invention.

What is claimed is:

1. A precision CNC facing lathe, comprising a facing head (10) mounted in slide ways and a feed slide (11) that is mounted in the slide ways, wherein, a ball screw feeder that can drive the feed slide (11) to move in radial direction is arranged on the facing head (10);

wherein, the ball screw feeder comprises a ball screw (14), an electric motor (12), a pulley belt (13), and ball screw assembly (19), wherein, the two ends of the ball screw (14) are fixed to the facing head (10) via supporting bearings (21), the electric motor (12) is connected to the ball screw (14) via the belt (13), and the ball screw (14) is connected to the feed slide (11) via the ball screw assembly (19); and wherein, a dynamic balancer is arranged on the facing head (10); the dynamic balancer comprises weight blocks (18), a weight cable (17), fixed blocks (16), and pulleys (20), the pulleys (20) are arranged in a pair, the weight cable (17) is wound on the pair of pulleys (20), the weight blocks (18) are fixed to the outer side of the weight cable (17), the fixed blocks (16) are fixedly connected to the ball screw assembly (19), and the weight cable (17) is connected to the fixed blocks (16).

* * * * *